Nov. 19, 1940.   A. C. GONZALEZ   2,221,969
STEAM AND AIR ENGINE
Filed March 17, 1938
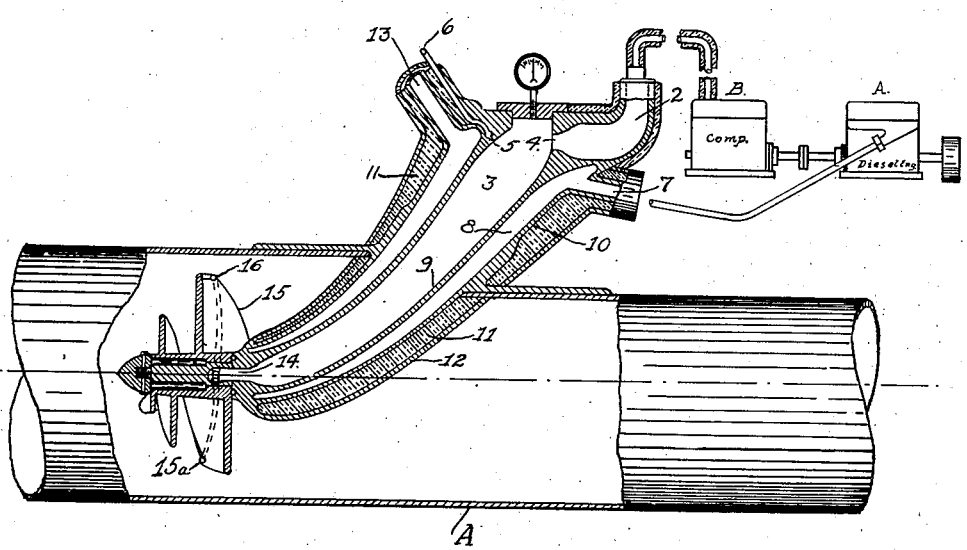
INVENTOR.
Augusto C. Gonzalez
BY
ATTORNEYS.

Patented Nov. 19, 1940

2,221,969

UNITED STATES PATENT OFFICE 2,221,969

STEAM AND AIR ENGINE

Augusto C. Gonzalez, Manila, P. I.

Application March 17, 1938, Serial No. 196,423

3 Claims. (Cl. 60—40)

My invention involves the conversion of energy by compressing air, while conserving its heat of compression, injecting water into a stream of the compressed air at a pressure somewhat higher than that of the air and at a temperature somewhat below boiling at that pressure, conducting the air and gas mixture to an expansion chamber where the water is flashed into steam and the steam and air mixture is superheated by the products of combustion from the compressor engine, and delivering the superheated and expanded mixture at high velocity direct to a reaction engine, as for example, a reaction propeller.

The accompanying drawing shows in vertical longitudinal section, a steam and air engine according to my invention, as applied to the driving of a ship's propeller.

Air is compressed, preferably adiabatically, as by the Diesel engine indicated at A, and the compressor indicated at B, and maintained as near as may be at compression temperature by thorough heat insulation. Air at, say, 300° F., and one hundred pounds pressure, is delivered from the compressor through pipe 2, thoroughly heat insulated, to an expansion chamber 3, which may have the elongated and curved form shown and into which, immediately opposite the delivery port 4 of the pipe 2, water is jetted through a series of apertures 5, connected to one or more water supply pipes 6 connected to a source not shown. The water may be injected at a temperature of about 212° F. at a pressure slightly above that of the air. Exhaust gases, as for example from a Diesel engine driving the compressor, at a temperature of about 550° F., enter through pipe 7 into the chamber 8 between the wall 9 of the expansion chamber and the exterior annular casing 10 of the chamber 8. Outside the exterior casing 10 of the superheating chamber 8, heat insulation 11 is provided, retained by casing 12. The hot gases, after circulating in the superheating chamber 8, are led by pipe 13 to the stack or otherwise discharged. The water-injecting means projects the water against the inside surface of the wall of the expansion chamber and the heated products of combustion impinge upon the outer wall of said chamber directly opposite the surface thereof impinged upon by the water.

The heated gases in the chamber 8 heat the wall 9 of the expansion chamber against which wall the jets of water are forced as they enter the expansion chamber, and the mixture is superheated and expanded and passes at high velocity to the inlet chamber 14 of a fan or propeller 15, and thence to the passages 15a, discharging at 16 in the trailing edges of the several blades or screws so as to cause the propeller to act as a reaction engine. The propeller is shown in an open-ended tubular propeller casing A, which however, is not a part of my invention.

It is pointed out that I use the expansive and kinetic force of a mixture of air and steam at a constant pressure to drive a reaction marine engine having no movable parts other than the screw-propeller assembly.

I claim:

1. An engine actuated by steam and air, comprising an expansion chamber, a reaction engine to which the expansion chamber is directly connected, a fuel combustion engine, means for applying the heated products of combustion therefrom to heat the wall of the expansion chamber and superheat the contents of said chamber, an air compressor actuated by the engine and delivering air at high temperature and pressure directly to the expansion chamber, and means for supplying water at high temperature and pressure directly to the expansion chamber.

2. An engine such as set forth in claim 1, in which the water-injecting means projects the water against the inside surface of the wall of the expansion chamber and the heated products of combustion impinge upon the outer wall of said chamber directly opposite the surface thereof impinged upon by the water.

3. An engine such as specified in claim 1 in which the superheating means comprise an insulated chamber surrounding the expansion chamber.

AUGUSTO C. GONZALEZ.